US011798197B2

(12) United States Patent
Le et al.

(10) Patent No.: US 11,798,197 B2
(45) Date of Patent: Oct. 24, 2023

(54) DATA COMPRESSION WITH A MULTI-SCALE AUTOENCODER

(71) Applicant: QUALCOMM Incorporated, San Diego, CA (US)

(72) Inventors: Hoang Cong Minh Le, Vancouver, WA (US); Reza Pourreza, San Diego, CA (US); Yang Yang, San Diego, CA (US); Yinhao Zhu, La Jolla, CA (US); Amir Said, San Diego, CA (US); Yizhe Zhang, San Diego, CA (US); Taco Sebastiaan Cohen, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/200,694

(22) Filed: Mar. 12, 2021

(65) Prior Publication Data

US 2022/0292725 A1    Sep. 15, 2022

(51) Int. Cl.
*G06T 9/00* (2006.01)
*G06N 3/08* (2023.01)
*G06T 3/40* (2006.01)

(52) U.S. Cl.
CPC ............... *G06T 9/002* (2013.01); *G06N 3/08* (2013.01); *G06T 3/4046* (2013.01)

(58) Field of Classification Search
CPC .................................. G06T 9/002; G06T 3/4046
See application file for complete search history.

(56) References Cited

U.S. PATENT DOCUMENTS

| 10,594,338 | B1* | 3/2020 | Lew | H03M 7/4043 |
| 10,965,948 | B1* | 3/2021 | Appalaraju | H04N 19/124 |
| 2020/0160565 | A1* | 5/2020 | Ma | H04N 19/60 |
| 2022/0103839 | A1* | 3/2022 | Van Rozendaal | H04N 19/184 |
| 2022/0237740 | A1* | 7/2022 | Lu | H04N 19/126 |
| 2022/0272345 | A1* | 8/2022 | Besenbruch | G06N 3/045 |
| 2022/0277492 | A1* | 9/2022 | Ryder | H04N 19/14 |
| 2023/0217028 | A1* | 7/2023 | Zhang | H04N 19/30 375/240.02 |

FOREIGN PATENT DOCUMENTS

CN    113014927 A  *  6/2021 ........... G06N 3/0454
WO    WO-2022139618 A1 * 6/2022

OTHER PUBLICATIONS

Huang C., et al., "Extreme Image Coding via Multiscale Autoencoders with Generative Adversarial Optimization", 2019 IEEE Visual Communications and Image Processing (VCIP), IEEE, Dec. 1, 2019 (Dec. 1, 2019), pp. 1-4, XP033693944, DOI: 10.1109/VCIP47243.2019.8966059 [Retrieved on Jan. 21, 2020].

(Continued)

*Primary Examiner* — Ian L Lemieux
(74) *Attorney, Agent, or Firm* — Seyfarth Shaw LLP

(57) ABSTRACT

A method of image compression includes receiving an image. Multiple quantized latent representations are generated to represent features of the image. Each of the quantized latent representations has a different resolution and is generated at staggered timings. Each of the later generated quantized latent representations is conditioned on each of the prior generated quantized latent representations. The multiple quantized latent representations are decoded to reconstruct the image.

20 Claims, 14 Drawing Sheets

(56) References Cited

OTHER PUBLICATIONS

International Search Report and Written Opinion—PCT/US2022/019600—ISA/EPO—dated Jul. 1, 2022.

Nakanishi K.M., et al., "Neural Multi-Scale Image Compression", May 26, 2019 (May 26, 2019), Advances in Databases and Information Systems, [Lecture Notes in Computer Science, Lect.Notes Computer], Springer International Publishing, CHAM, pp. 718-732, XP047508336, ISBN: 978-3-319-10403-4 [Retrieved on May 26, 2019].

Pessoa J., et al., "End-to-End Learning of Video Compression using Spatio-Temporal Autoencoders", 2020 IEEE Workshop on Signal Processing Systems (SIPS), IEEE, Oct. 20, 2020 (Oct. 20, 2020), pp. 1-6, XP033852104, ISSN: 2374-7390, DOI: 10.1109/SIPS50750.2020.9195249, ISBN: 978-1-7281-8099-1 [Retrieved on Sep. 11, 2020].

\* cited by examiner

DATA COMPRESSION WITH A MULTI-SCALE AUTOENCODER

BACKGROUND

Field

Aspects of the present disclosure generally relate to data compression with artificial neural networks.

Background

Artificial neural networks may comprise interconnected groups of artificial neurons (e.g., neuron models). The artificial neural network may be a computational device or be represented as a method to be performed by a computational device. Convolutional neural networks are a type of feed-forward artificial neural network. Convolutional neural networks may include collections of neurons that each have a receptive field and that collectively tile an input space. Convolutional neural networks (CNNs), such as deep convolutional neural networks (DCNs), have numerous applications. In particular, these neural network architectures are used in various technologies, such as image recognition, speech recognition, acoustic scene classification, keyword spotting, autonomous driving, and other classification tasks.

Artificial neural networks also have numerous applications in image-based processing of videos or video streams such as human pose estimation, object detection, semantic segmentation, as well as video compression and de-noising. Unfortunately, such video processing is computationally intensive, which may result in significant time and energy consumption.

SUMMARY

In an aspect of the present disclosure, a method of image compression is provided. The method includes receiving an image. The method also includes generating multiple quantized latent representations to represent features of the image. Each of the quantized latent representations has a different resolution and is generated at staggered timings. Additionally, later generated quantized latent representations are conditioned on prior generated quantized latent representations. Further, the method includes decoding the multiple quantized latent representations to reconstruct the image.

In another aspect of the present disclosure, an apparatus for image compression is provided. The apparatus includes a memory and one or more processors coupled to the memory. The processor(s) are configured to receive an image. The processor(s) are also configured to generate multiple quantized latent representations to represent features of the image. Each of the quantized latent representations has a different resolution and is generated at staggered timings. Additionally, later generated quantized latent representations are conditioned on prior generated quantized latent representations. Further, the processor(s) are configured to decode the multiple quantized latent representations to reconstruct the image.

In another aspect of the present disclosure, an apparatus for image compression is provided. The apparatus includes means for receiving an image. The apparatus also includes means for generating multiple quantized latent representations to represent features of the image. Each of the quantized latent representations has a different resolution and is generated at staggered timings. Additionally, later generated quantized latent representations are conditioned on prior generated quantized latent representations. Further, the apparatus includes means for decoding the multiple quantized latent representations to reconstruct the image.

In a further aspect of the present disclosure, a non-transitory computer readable medium is provided. The computer readable medium has encoded thereon program code for image compression. The program code is executed by a processor and includes code to receive an image. The program code also includes code to generate multiple quantized latent representations to represent features of the image. Each of the quantized latent representations has a different resolution and is generated at staggered timings. Additionally, later generated quantized latent representations are conditioned on prior generated quantized latent representations. Furthermore, the program code includes code to decode the multiple quantized latent representations to reconstruct the image.

In still further aspects, a method includes receiving quantized latent representations corresponding to an image, each of the quantized latent representations received at staggered timings and having different resolutions. The method also includes decoding the quantized latent representations to reconstruct data for each of the different resolutions; and fusing the reconstructed data for each of the different resolutions to generate a reconstructed image.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
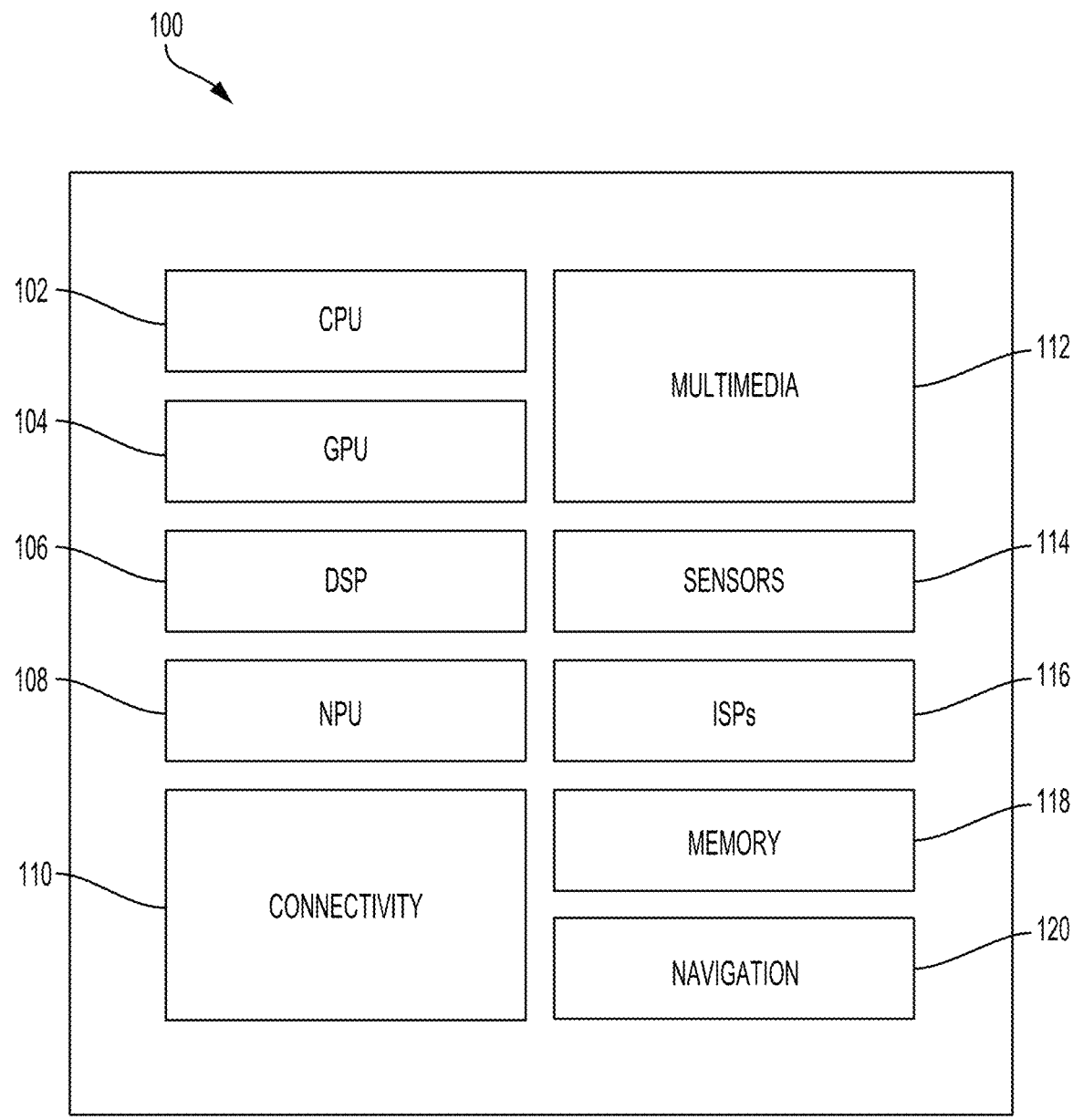
FIG. 1 illustrates an example implementation of a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Artificial neural networks also have numerous applications in image-based processing of videos or video streams such as human pose estimation, object detection, semantic segmentation, as well as video compression and de-noising. Unfortunately, such video processing is computationally intensive, which results in significant time and energy consumption.

Multi-scale architectures are becoming more popular for image processing and perception related tasks. However, the conventional multi-scale architectures are cumbersome and increase computational complexity, resulting in increased processing time and energy consumption.

Accordingly, aspects of the present disclosure are directed to a multi-scale autoencoder for image compression.

FIG. 1 illustrates an example implementation of a system-on-a-chip (SOC) 100, which may include a central processing unit (CPU) 102 or a multi-core CPU configured for image compression via an artificial neural network. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to receive an image. The general-purpose processor 102 may also include code to generate multiple quantized latent representations to represent features of the image. Each of the quantized latent representations has a different resolution and is generated at staggered timings. Later generated quantized latent representations are conditioned on prior generated quantized latent representations. The general-purpose processor 102 may further include code to decode the multiple quantized latent representations to reconstruct the image.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
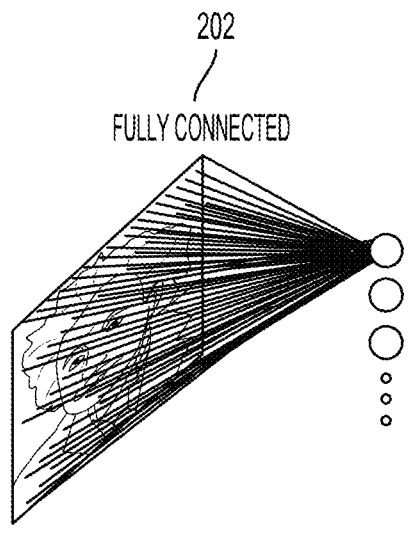
FIGS. 2A, 2B, and 2C are diagrams illustrating a neural network in accordance with aspects of the present disclosure.
Figure 2B:
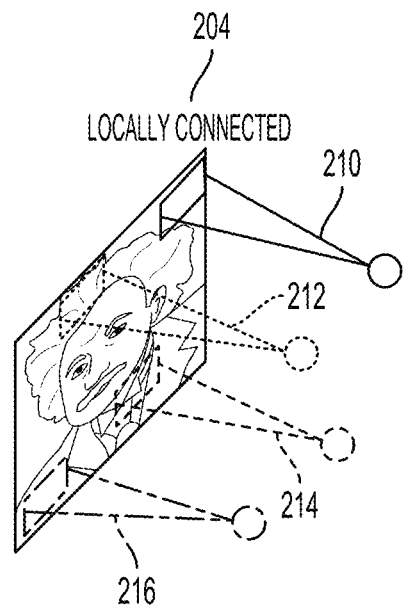

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
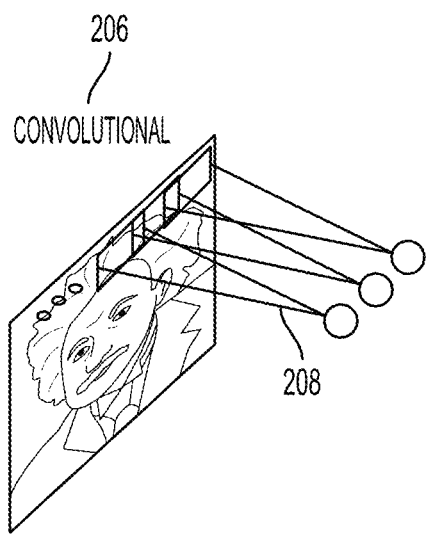

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
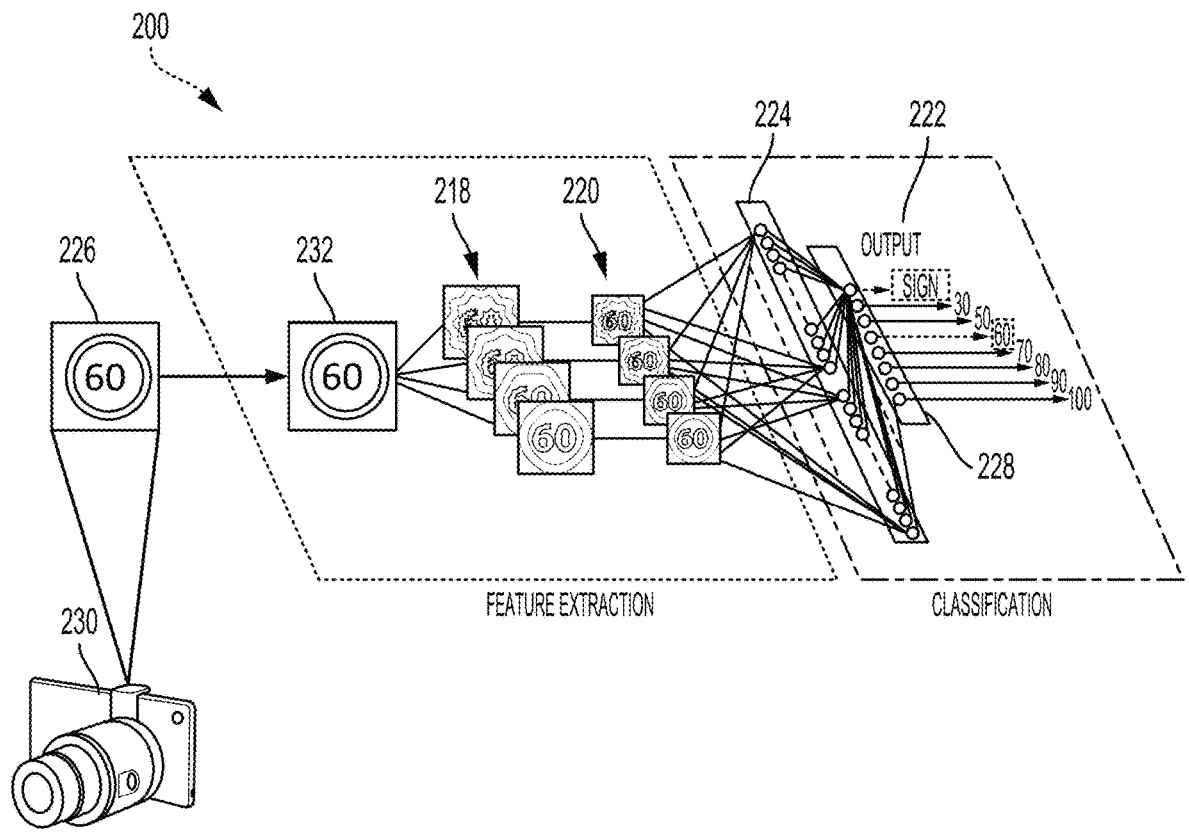
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down-sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
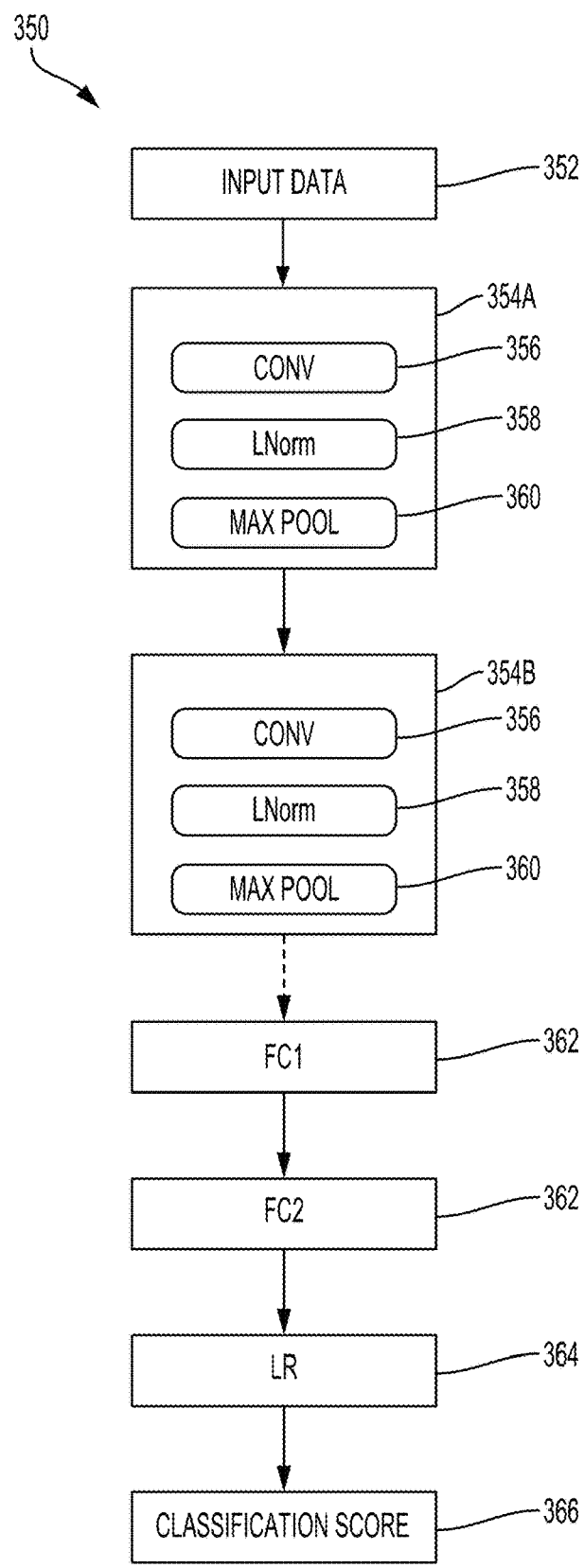
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down-sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
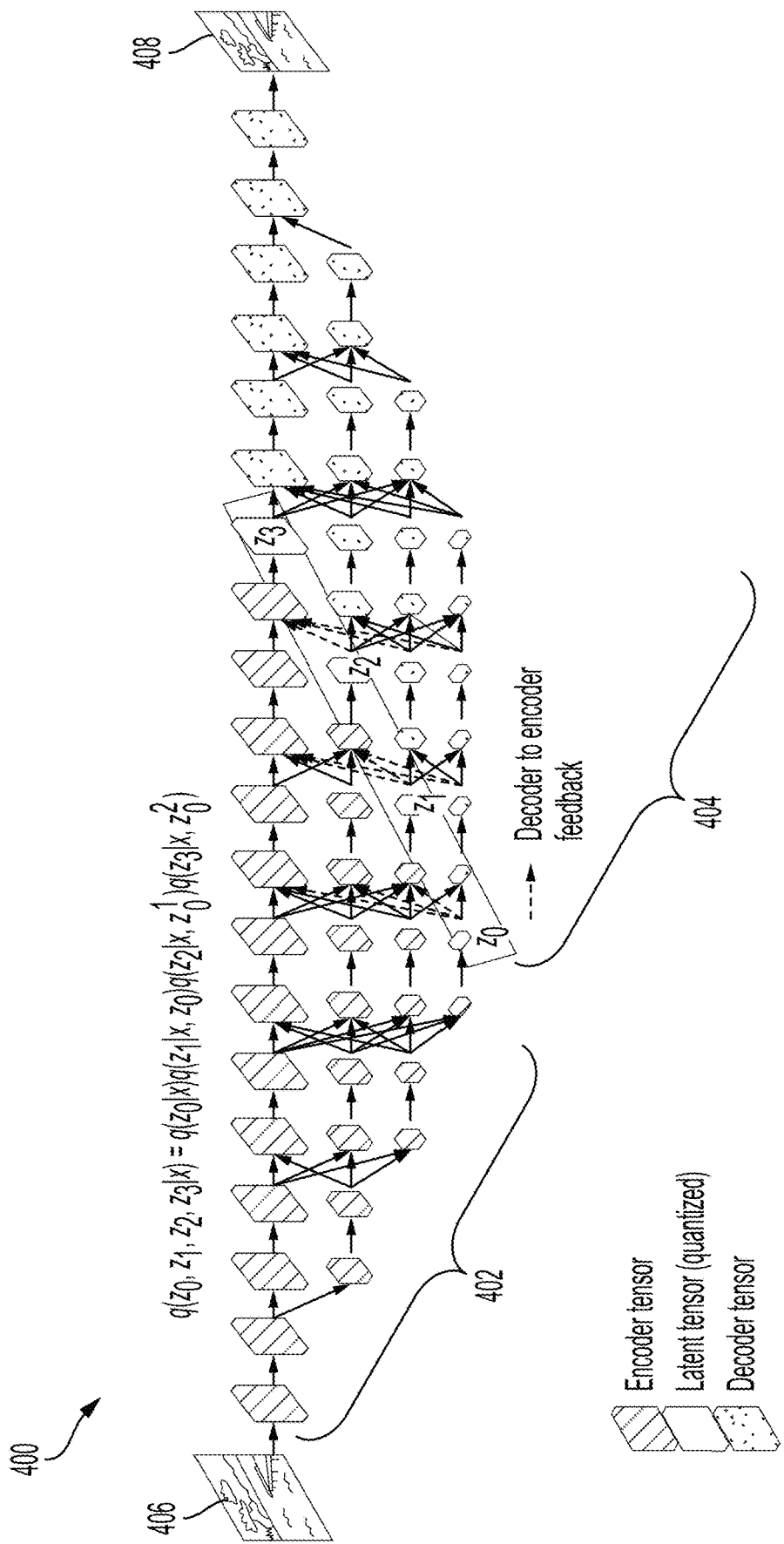
FIG. 4 is a block diagram illustrating an example multi-scale autoencoder for image compression, in accordance with aspects of the present disclosure.

FIG. 4 is a block diagram illustrating an example multi-scale autoencoder 400 for image compression, in accordance with aspects of the present disclosure. Referring to FIG. 4, the example multi-scale autoencoder 400 includes an encoder 402 and a decoder 404. The encoder 402 includes a set of encoder tensors and the decoder 404 includes a set of decoder tensors.

The encoder 402 receives an original input image 406 and extracts a set of features to generate a representation of the image. Additionally, the encoder 402 may successively down-sample the image 406 to generate one or more scaled representations of the image 406. Each of the scaled representations may have a different lower resolution than the image 406. Each of the scaled latent representations is quantized. The quantized scaled latent representations are generated at staggered timings such that the latent representation for the lowest scaled image is generated first. For example, latent representation $z_0$ is generated before latent representation $z_1$, and so on. Each successive scaled representation is conditioned on each of the lower scaled representations, according to the following:

$$q(z_0, z_1, z_2, z_3|x) = q(z_0|x)q(z_1|x, z_0)q(z_2|x, z_0^1)q(z_3|x, z_0^2), \quad (1)$$

where x is an input and $z_0$, $z_1$, $z_2$, $z_3$ are quantized scaled latent representations of the input with $z_3$ having the resolution of the original input image 406, and $z_2$, $z_1$ and $z_0$ representing successively lower resolution features of the original input image 406. Additionally, the notation $z_0^n$ means the group of elements $z_n$ thru $z_0$.

The progressive fashion in which the latent quantization is performed beneficially allows higher resolutions to capture and correct quantization errors at lower resolution latent representations. Additionally, because of the staggered generation of the quantized scaled latent representations, the decoder 404 may provide feedback to the encoder 402, as indicated by the dashed arrow. For example, the quantized scaled latent representation $z_0$ is supplied to the decoder 404. As the quantized scaled latent representation $z_0$ is subjected to stages of convolutions in the decoder 404, the convolution outputs may be fed back and contribute to generation of higher scaled quantized latent representations (e.g., $z_2$ and $z_3$).

The decoder 404 receives the quantized scaled latent representations. Each of the quantized scaled latent representations may be received in accordance with the staggered timing and may be processed through an application of a sequence of decoder tensors. In decoding each of the quantized scaled latent representations, each representation may be successively up-sampled and combined to generate a reconstructed image 408.

Figure 5:
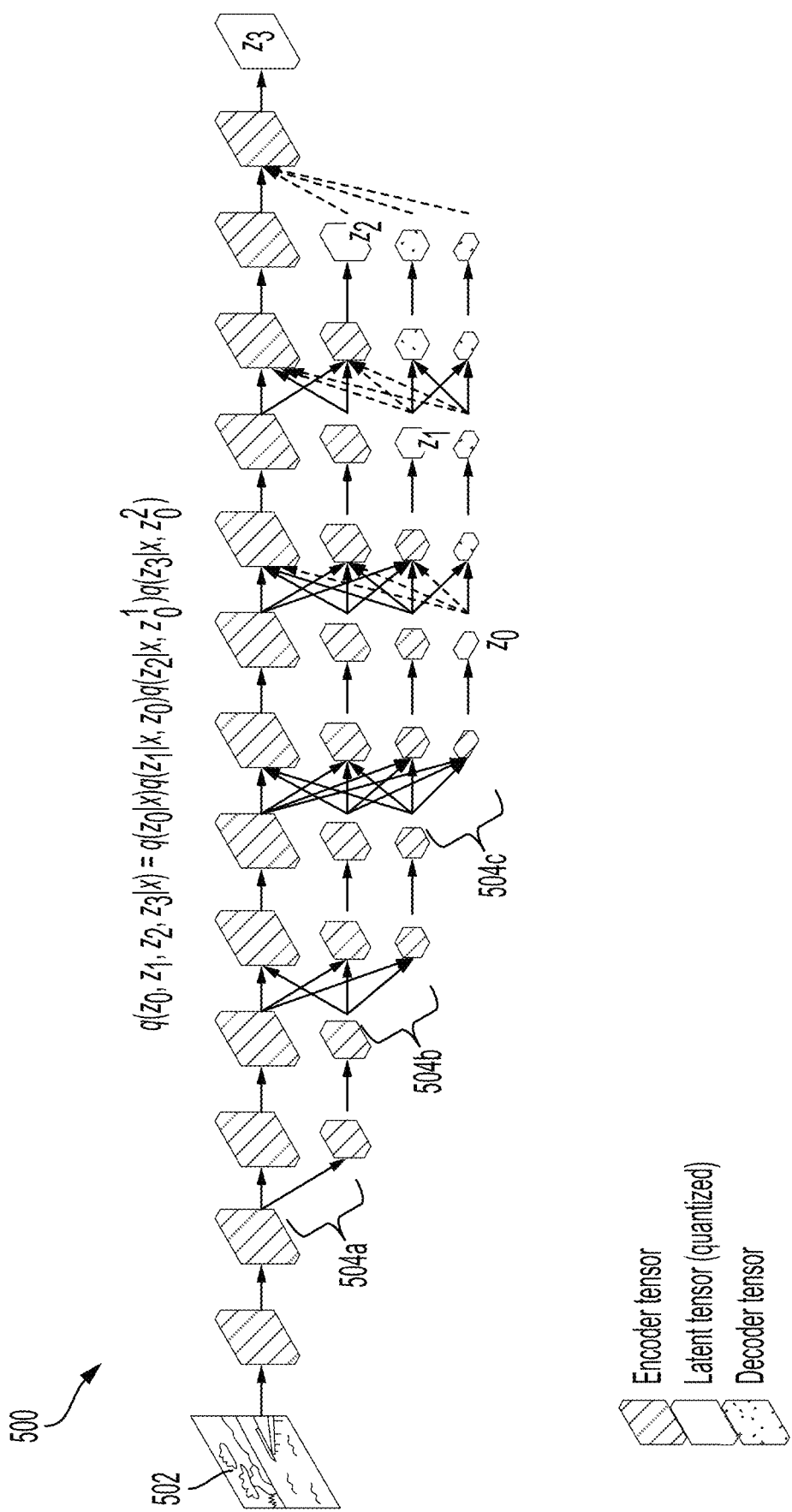
FIG. 5 is a diagram illustrating an example encoder, in accordance with aspects of the present disclosure.

FIG. 5 is a diagram illustrating an example encoder 500, in accordance with aspects of the present disclosure. The example encoder 500 may be configured and function similar to that of the encoder 402 shown in FIG. 4. As shown in FIG. 5, the encoder 500 may receive an input 502, such as an image. The input 502 is processed through stages of convolutional filters to extract a set of features representing the input 502. Additionally, the encoder 500 may apply down-sampling (see e.g., 504a) to produce features at a lower scale or resolution. The down-sampling may be iteratively repeated to produce further, more coarse scaled features (e.g., 504b and 504c).

The quantization of the scaled features is conducted in a progressive fashion. As shown in FIG. 5, the most coarse scaled feature representation is quantized first to produce the quantized scaled latent representation $z_0$. Thereafter, the next higher scaled representation is quantized to produce the quantized scaled latent representation $z_1$. The process is repeated until the highest scaled feature is quantized to produce the quantized scaled latent representation $z_3$.

As described, the progressive fashion in which the latent quantization is performed beneficially allows higher resolutions to capture and correct quantization errors at lower resolution latent representations. Unlike conventional multi-scale encoders that pass quantization errors to the decoder, the encoder 500 is configured to capture and correct the quantization error by feeding back to the next scaled latent representation. For example, the quantized scaled latent representation $z_0$ provides feedback, which is captured via the quantized scaled latent representations $z_1$, $z_2$, and $z_3$ (shown via dashed arrows).

Figure 6:
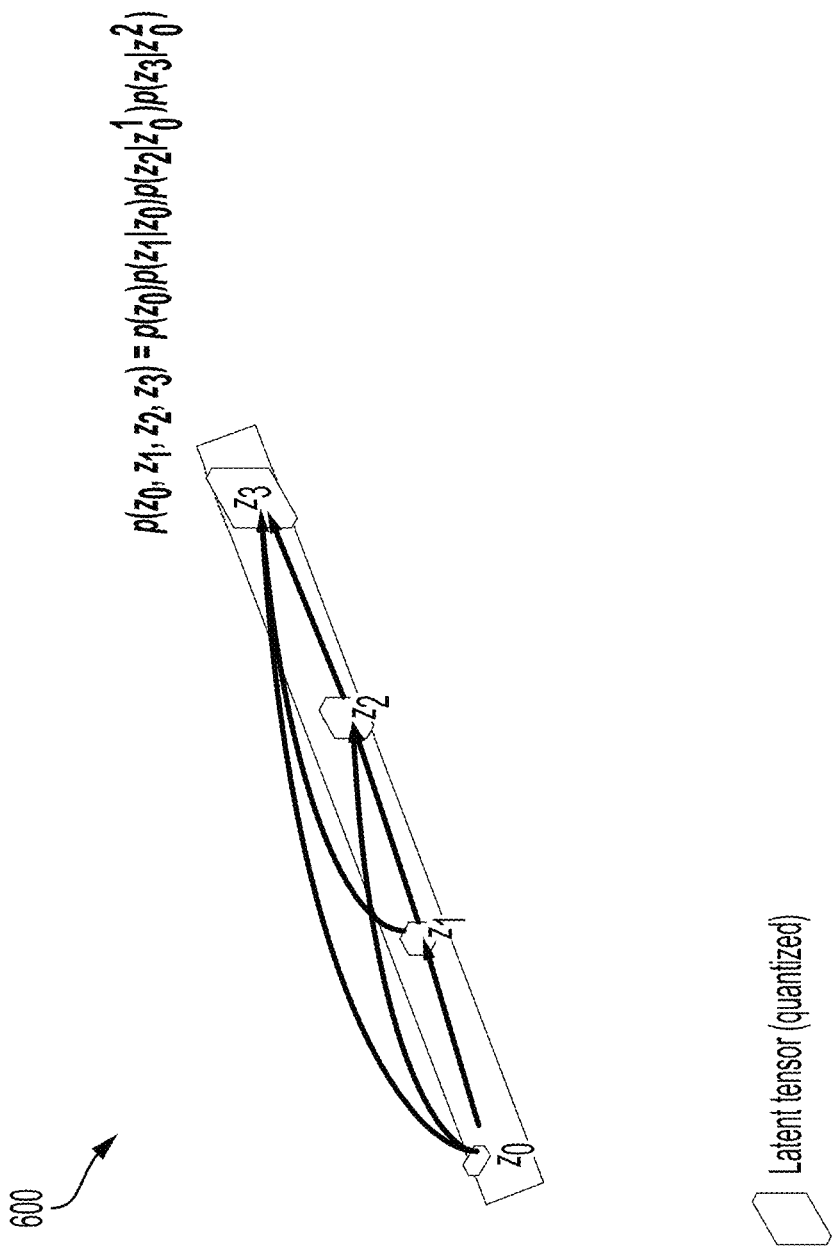
FIG. 6 is a block diagram illustrating the relationship between quantized scaled latent representations, in accordance with aspects of the present disclosure.

FIG. 6 is a block diagram of a latent tensor 600 illustrating the relationship between quantized scaled latent representations $z_0$-$z_3$, in accordance with aspects of the present disclosure. As shown in FIG. 6, each of the higher scaled quantized latent representations is conditioned on the each of the lower scaled quantized representations. Having formed each of these discrete latent representations (e.g., $z_0$, $z_1$, $z_2$, and $z_3$), an entropy model may be learned. That is, the probability distribution for each of the discrete latent representations may be learned such that the encoder may convert each of the discrete representations into a sequence of bits that may be supplied to a decoder (e.g., 404 of FIG. 4). The entropy model may be expressed as:

$$p(z_0, z_1, z_2, z_3) = p(z_0)p(z_1|z_0)p(z_2|z_0^1)p(z_3|z_0^2). \quad (2)$$

Figure 7:
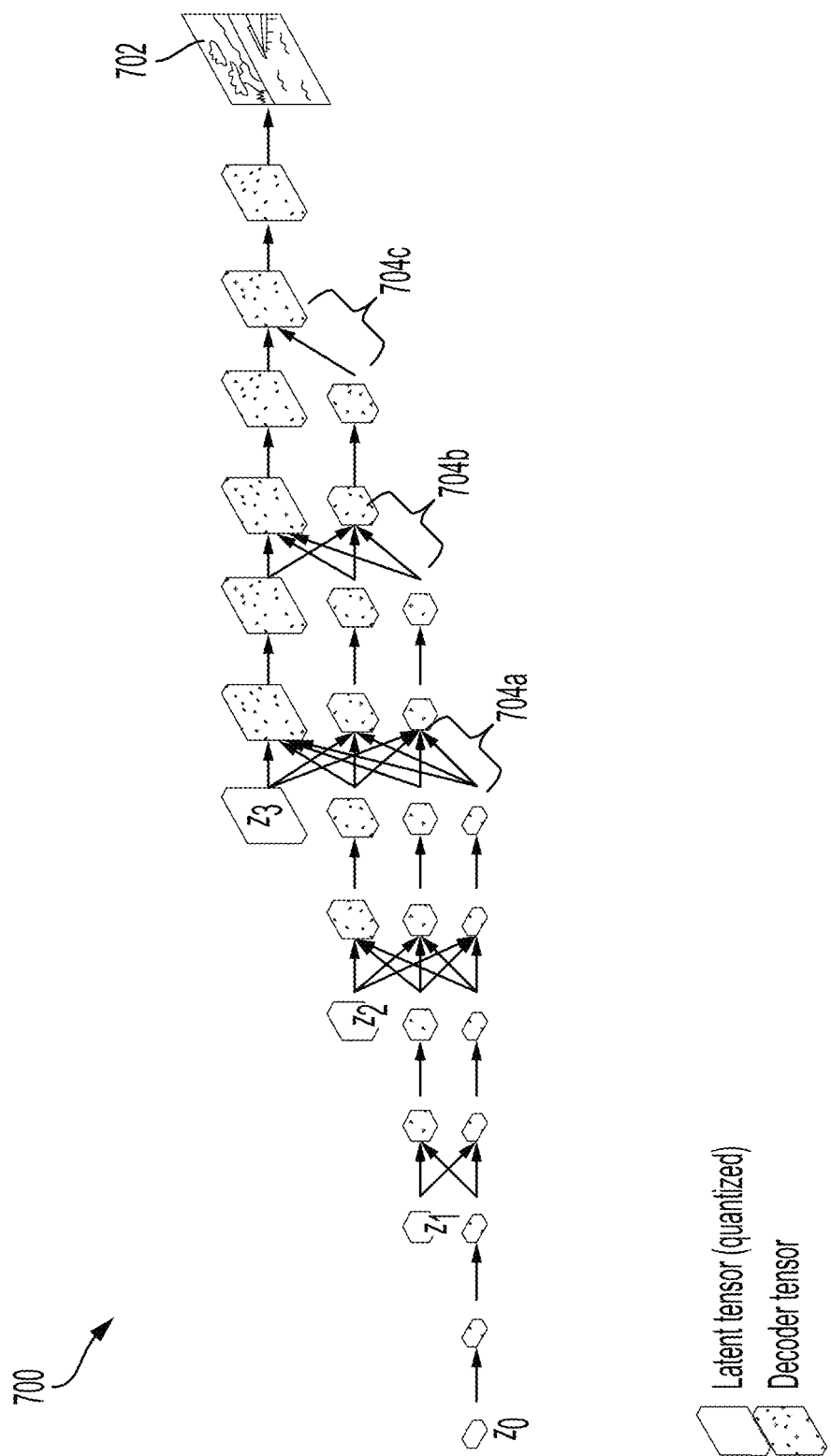
FIG. 7 is a block diagram illustrating an example decoder, in accordance with aspects of the present disclosure.

FIG. 7 is a block diagram illustrating an example decoder 700, in accordance with aspects of the present disclosure. The example decoder 700 may be configured and function similar to that of the decoder 404 shown in FIG. 4. Referring to FIG. 7, the decoder 700 entropy decodes and receives the quantized scaled latent representations (e.g., $z_0$, $z_1$, $z_2$, and $z_3$). Each of the quantized scaled latent representations may be received in accordance with staggered timing and may be processed through an application of a sequence of decoder tensors. As the quantized scaled latent representations are processed, each representation may be successively up-sampled (e.g., 704a, 704b, and 704c) and combined or fused together to generate a full-resolution reconstructed image 702.

The staggered fashion of quantization also enables pipelining of processing. For instance, some processing via the encoder (e.g., 500 of FIG. 5) may be performed simultaneously with entropy encoding. Likewise, some processing via the decoder (e.g., 700) may be performed simultaneously with entropy decoding.

Figure 8A:
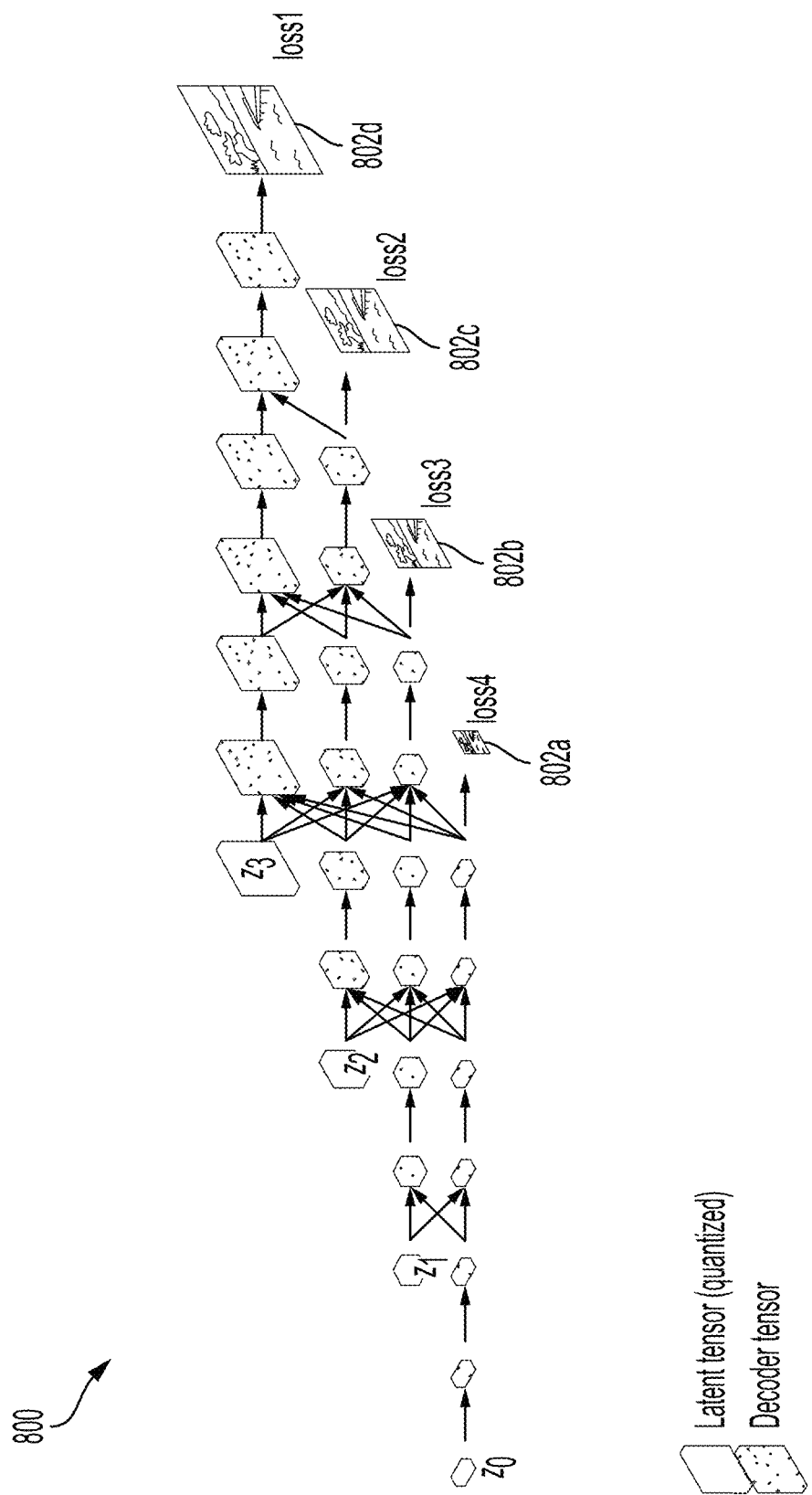
FIGS. 8A and 8B are block diagrams illustrating example implementations of an auto-regressive decoder, in accordance with aspects of the present disclosure.
Figure 8B:
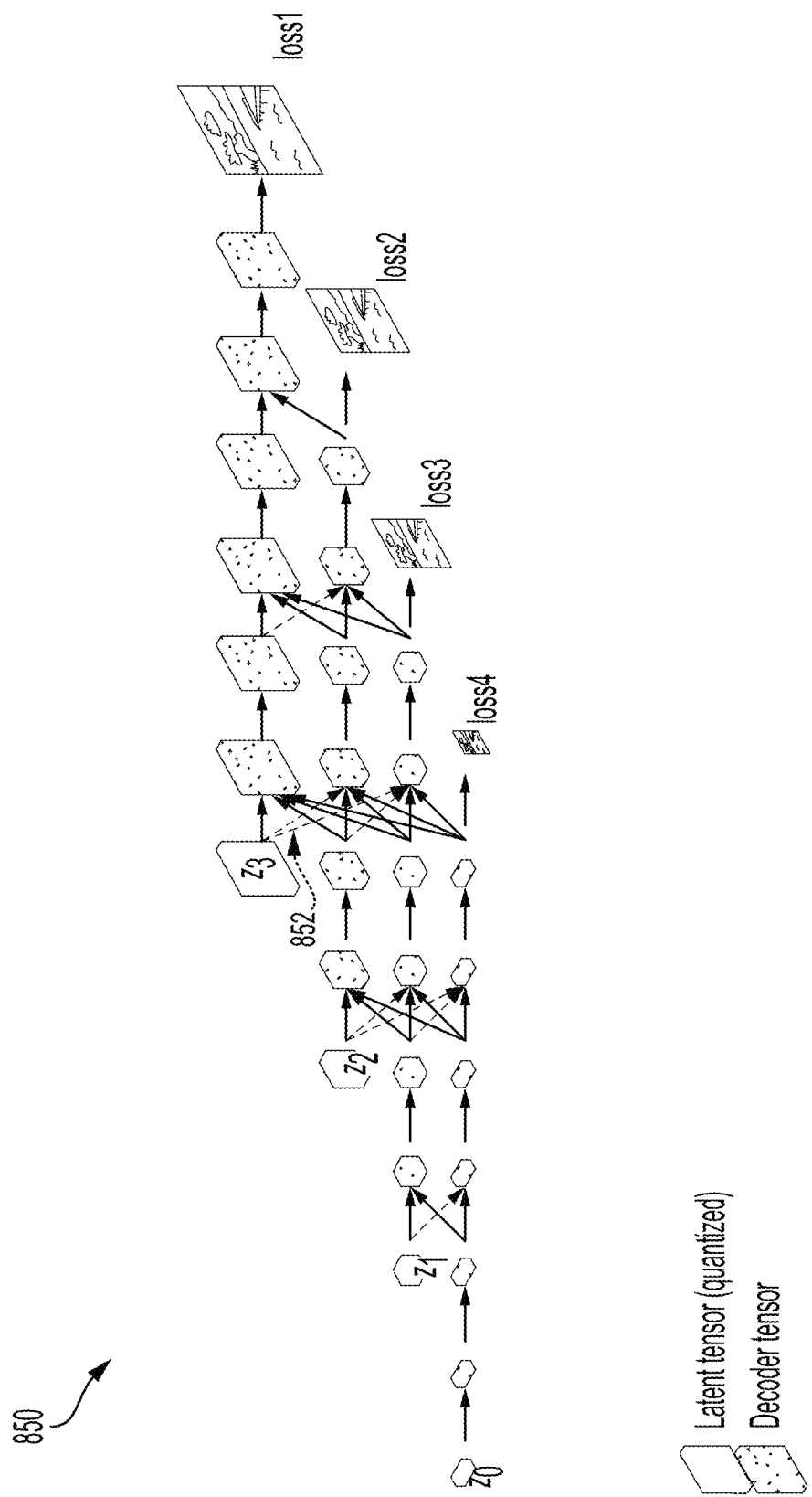

FIGS. 8A and 8B are block diagrams illustrating example implementations of auto-regressive decoders 800 and 850, respectively, in accordance with aspects of the present disclosure. Referring to FIG. 8A, in addition to fusing all of the multi-scaled latent representations together to generate a full-resolution reconstructed image (e.g., 702 as shown in FIG. 7), outputs may be reconstructed at each of the different resolutions (e.g., 802a, 802b, 802c, and 802d) according to a specified loss term. That is, when a single output image is generated (e.g., FIG. 7), the loss function is given by R+λD, where R is rate and D is the distortion between the input image (e.g., 502 as shown in FIG. 5) and the reconstructed image (e.g., 702 as shown in FIG. 7). When an output is generated at different resolutions (e.g., as shown in FIG. 8A), the loss function is given by R+λ($D_1+D_2+\cdots+D_i$), where $D_i$ is the distortion between the input image (e.g., 502 as shown in FIG. 5) and the output at scale i (e.g., 802a-d).

Referring to FIG. 8B, rather than using each of the higher scaled latent representations to produce the lower resolution outputs as shown in FIG. 8A, the decoder 850 may disconnect the connection (removed connection are shown in dashed lines (e.g., 852)) between the quantized scaled latent representation (e.g., $z_3$) and lower scaled resolutions. As such, the decoder 850 may learn a hierarchical representation of latent representations across scales.

In some aspects, the auto-regressive decoder (e.g., 800 and 850) may be trained in a stage-wise basis. For, example, the auto-regressive decoder 800 may be trained based on the loss for the lowest stage (e.g., resolution), the loss 4 objective function. When the loss on a training dataset converges (e.g., stops decreasing), the auto-regressive decoder 800 may then be trained based on loss 3 objective function. Thereafter, when the loss on the training dataset converges (e.g., stops decreasing), the auto-regressive decoder 800 may then be trained based on loss 3 objective function. This stage by stage process of training the auto-regressive decoder 800 may be repeated until the auto-regressive decoder 800 is trained based on the loss objective function for each stage. The loss objective function for each stage is based on the resolution for that stage.

Figure 9A:
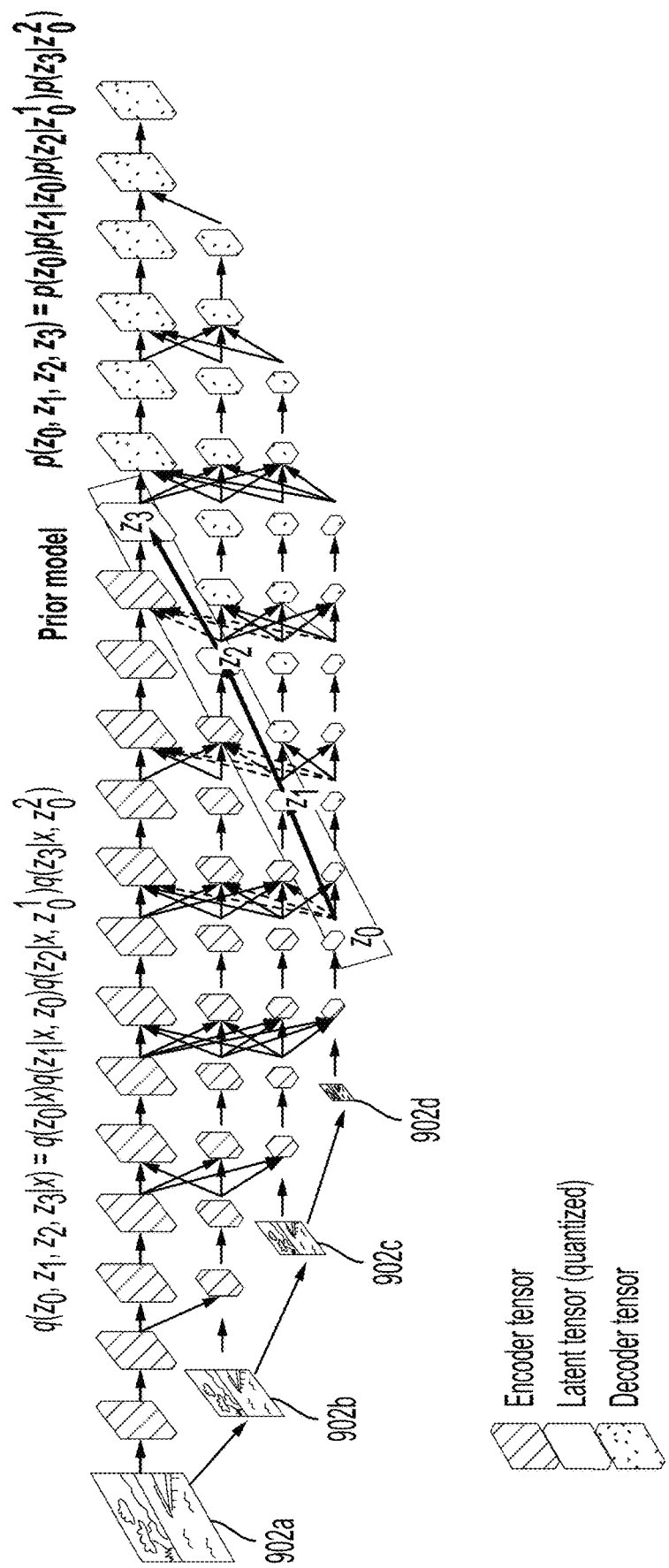
FIGS. 9A-9B are block diagrams illustrating example multi-scale autoencoders with linear transforms, in accordance with aspects of the present disclosure.
Figure 9B:
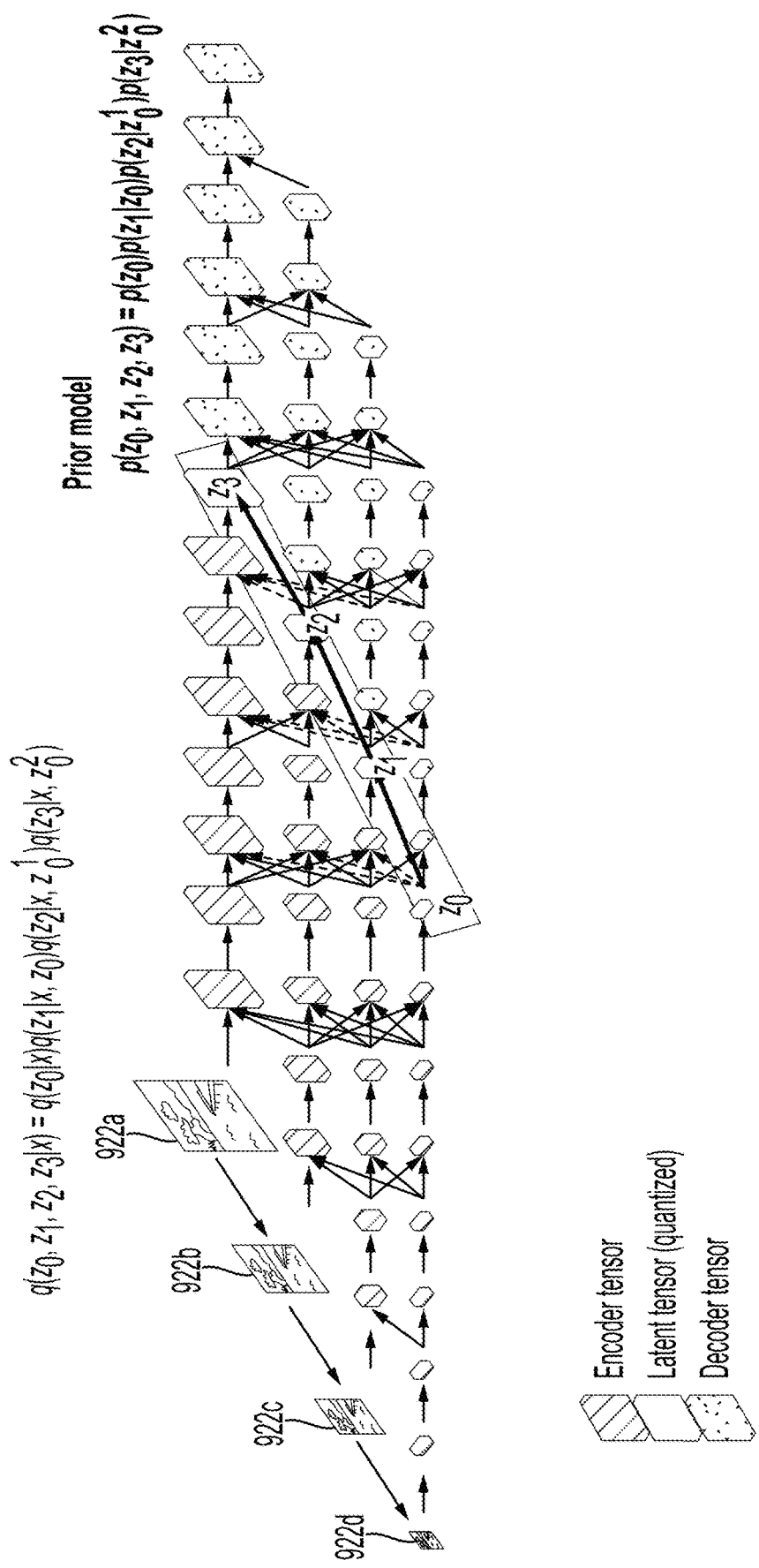

FIGS. 9A-9B are block diagrams illustrating example multi-scale autoencoders with linear transforms, in accordance with aspects of the present disclosure. As shown in FIG. 9A, an input 902a is repeatedly down-sampled to form inputs 902b, 902c, and 902d. In some aspects, the lower resolution inputs (e.g., 902b, 902c, and 902d) may be derived by applying multi-scale decomposition. In one example, the multi-scale decomposition may be applied via a discrete wavelet transform (DWT).

Referring to FIG. 9B, multi-resolution inputs 922a-d may be formed by down sampling or via multi-scale decomposition, for example. Because a low-resolution input (e.g., 922d) is available, the network can start with the processing of a lowest resolution input 922d in the encoder tensor with high-resolution inputs (e.g., 922a, 922b and 922c) gradually absorbed. Accordingly, compute resources may be distributed across scales (e.g., resolutions). In some aspects, the compute resources may be evenly distributed across scales. Processing may be performed by starting from the smallest scale (e.g., lowest resolution) to capture the image details at a coarse granularity and progressively combining details by processing each of the higher scales.

Figure 9C:
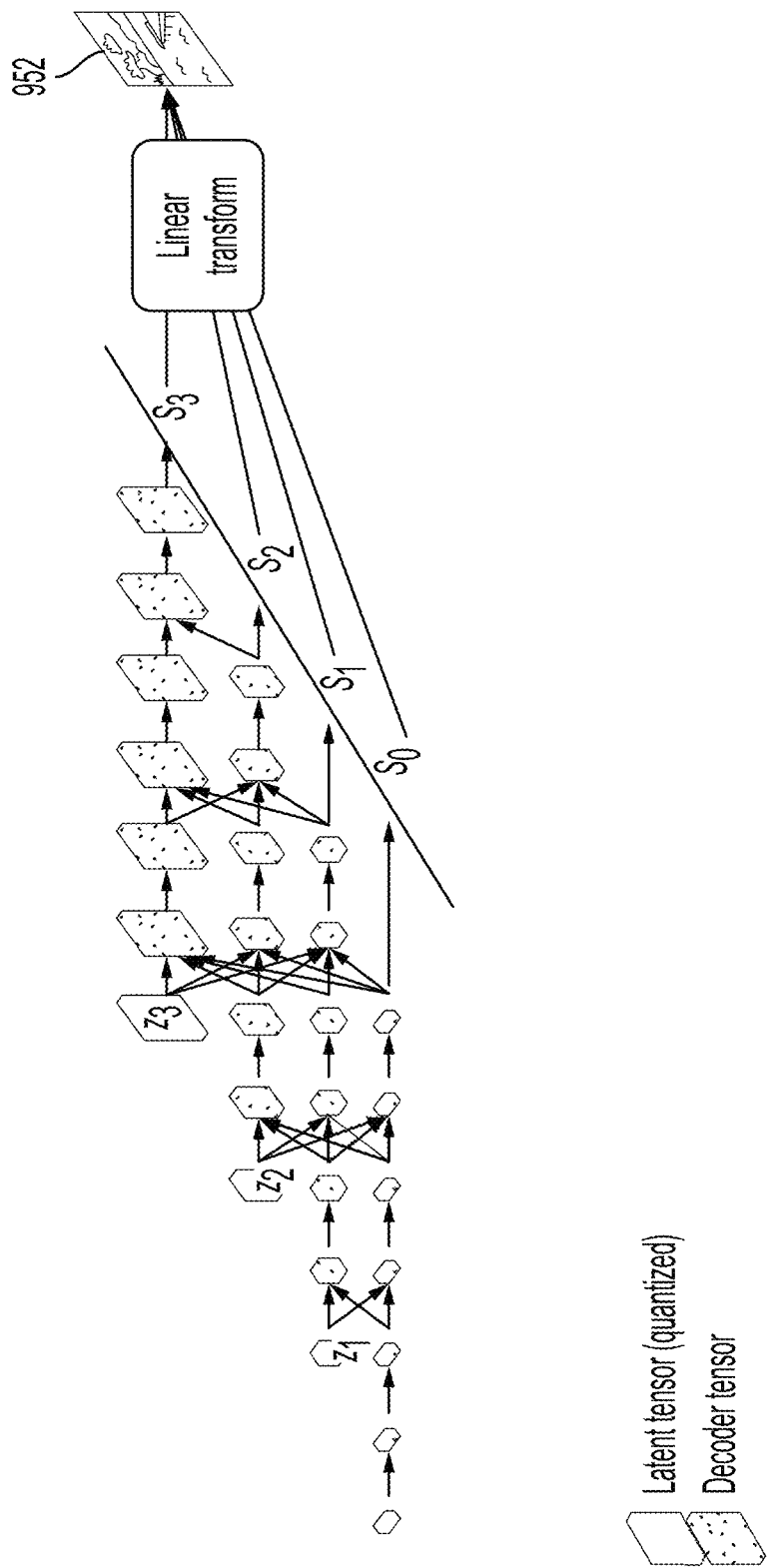
FIG. 9C is a block diagram illustrating an example multi-scale decoder with linear transforms, in accordance with aspects of the present disclosure.

FIG. 9C is a block diagram illustrating an example multi-scale decoder with linear transforms, in accordance with aspects of the present disclosure. As shown in FIG. 9C, a reconstructed image 952 may be produced as a linear transformation of $s_0$, $s_1$, $s_2$, $s_3$. For example, the reconstructed image 952 may be produced as follows:

Output=us(us(us($s_0$)+$s_1$)+$s_2$)+$s_3$

Output=$us^3$($s_0$)+$us^2$($s_1$)+us($s_2$)++$s_3$

Output=inverse-DWT($s_0$, $s_1$, $s_2$, $s_3$)

where us is up-sampling and inverse-DWT is an inverse discrete wavelet transform.

Accordingly, as shown in the examples of FIGS. 9A and 9B, input images at different resolution may be generated by applying linear transformations (e.g., discrete wavelet transform). Then, in turn, on the decoder side, as illustrated in the example of FIG. 9C, the corresponding inverse linear transform operation (e.g., inverse DWT) may be performed to convert the multi-scale output to a single full-resolution image (e.g., reconstructed image 952).

Figure 10:
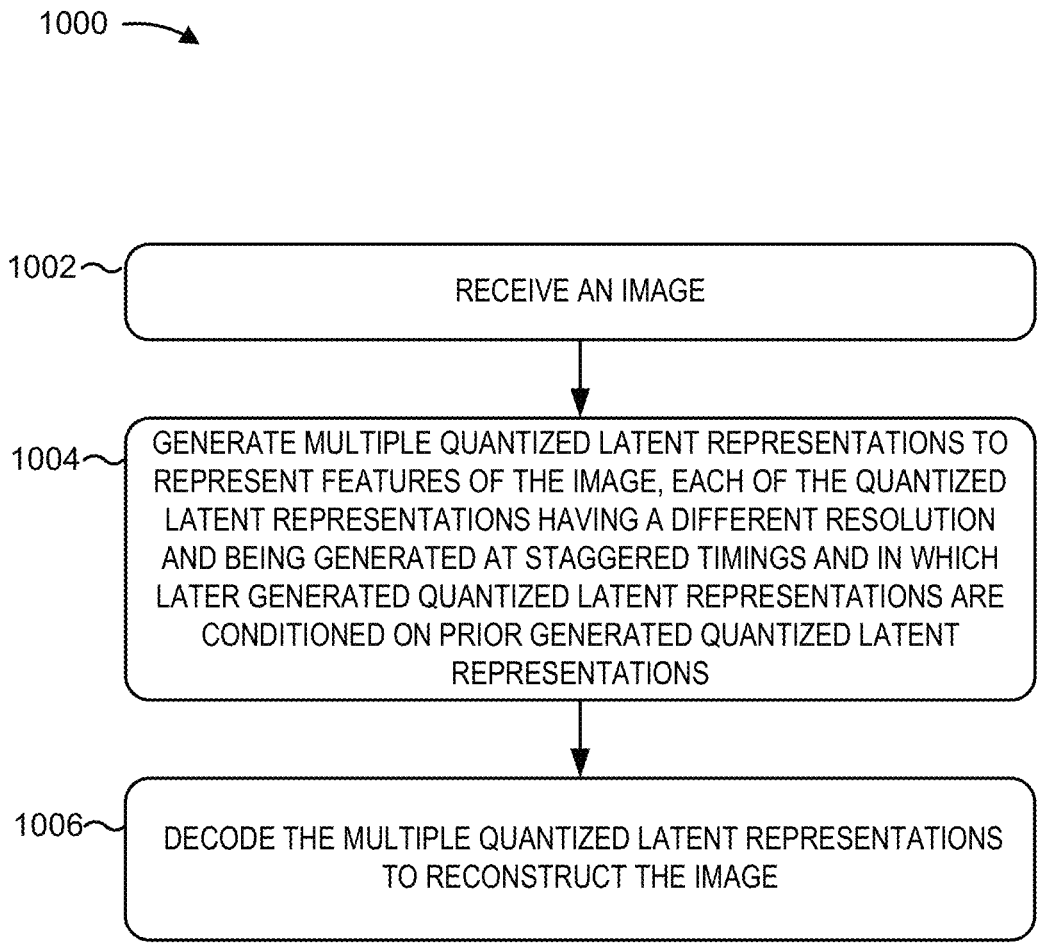
FIG. 10 is a flow diagram illustrating a method for image compression, in accordance with aspects of the present disclosure.

FIG. 10 illustrates a method 1000 for image compression, in accordance with aspects of the present disclosure. As shown in FIG. 10, at block 1002, an image is received. At block 1004, multiple quantized latent representations are generated to represent features of the image. Each of the quantized latent representations has a different resolution and is generated at staggered timings. In addition, later generated quantized latent representations are conditioned on prior generated quantized latent representations. As described, for example, with respect to FIG. 4, the encoder 402 may successively down-sample the image 406 to generate one or more scaled representations of the image 406. Each of the scaled representations may have a different lower resolution than the image 406. Each of the scaled latent representations is quantized. The quantized scaled latent representations are generated at staggered timings such that the latent representation for the lowest scaled image is generated first. Each successive scaled representation is conditioned on each of the lower scaled representations.

Furthermore, at block 1006, the multiple quantized latent representations are decoded to reconstruct the image. For instance, as described with reference to FIG. 4, the decoder 404 receives the quantized scaled latent representations. Each of the quantized scaled latent representations may be received in accordance with the staggered timing and may be processed through an application of a sequence of decoder tensors. In decoding each of the quantized scaled latent representations, each representation may be successively up-sampled and combined to generate a reconstructed image 408. The reconstructed data for each of the different resolutions may be fused to generate the reconstructed image.

Implementation examples are described in the following numerated clauses:

1. A method of image compression comprising:
receiving an image; and
generating multiple quantized latent representations to represent features of the image, each of the quantized latent representations having a different resolution and being generated at staggered timings and in which later generated quantized latent representations are conditioned on prior generated quantized latent representations.

2. The method of clause 1, further comprising decoding the multiple quantized latent representations to reconstruct the image.

3. The method of any of the preceding clauses, further comprising supplying as feedback a quantization error for a first quantized latent representation, the quantization error being applied for generating a next succeeding quantized latent representation.

4. The method of any of the preceding clauses, further comprising learning a hierarchical representation of latent representations across different resolutions.

5. The method of any of the preceding clauses, in which processing for generating the multiple quantized latent representations is performed in parallel.

6. The method of any of the preceding clauses, in which processing of computations for generating the multiple quantized latent representations is distributed evenly across the multiple quantized latent representations.

7. The method of any of the preceding clauses, in which the multiple quantized latent representations are respectively generated based on separate input images, the separate input images being formed by repeatedly down-sampling the received image.

8. An apparatus for image compression comprising:
a memory; and at least one processor coupled to the memory, the at least one processor being configured:

to receive an image; and to generate multiple quantized latent representations to represent features of the image, each of the quantized latent representations having a different resolution and being generated at staggered timings and in which later generated quantized latent representations are conditioned on prior generated quantized latent representations.

9. The apparatus of clause 8, in which the at least one processor is further configured to decode the multiple quantized latent representations to reconstruct the image.

10. The apparatus of clause 8 or 9, in which the at least one processor is further configured to supply as feedback a quantization error for a first quantized latent representation, the quantization error being applied for generating a next succeeding quantized latent representation.

11. The apparatus of clause 8 or 9 or 10, in which the at least one processor is further configured to learn a hierarchical representation of latent representations across different resolutions.

12. The apparatus of any of clauses 8-11, in which the at least one processor is further configured to perform processing for generating the multiple quantized latent representations in parallel.

13. The apparatus of any of clauses 8-12, in which the at least one processor is further configured to distribute processing of computations for generating the multiple quantized latent representations evenly across the multiple quantized latent representations.

14. The apparatus of any of clauses 8-13, in which the at least one processor is further configured to generate the multiple quantized latent representations based respectively on separate input images, the separate input images being formed by repeatedly down-sampling the received image.

15. An apparatus for image compression comprising:

means for receiving an image; and means for generating multiple quantized latent representations to represent features of the image, each of the quantized latent representations having a different resolution and being generated at staggered timings and in which later generated quantized latent representations are conditioned on prior generated quantized latent representations.

16. The apparatus of clause 15, further comprising means for reconstructing the image at multiple resolutions.

17. The apparatus of clause 15 or 16, further comprising means for supplying as feedback a quantization error for a first quantized latent, the quantization error being applied for generating a next succeeding quantized latent.

18. The apparatus of clause 15 or 16 or 17, further comprising means for learning a hierarchical representation of latent representations across different resolutions.

19. The apparatus of any of clauses 15-18, further comprising means for performing processing for generating the multiple quantized latent representations in parallel.

20. The apparatus of any of clauses 15-19, further comprising means for distributing processing of computations for generating the multiple quantized latent representations evenly across the multiple quantized latent representations.

21. The apparatus of any of clauses 15-20, further comprising means for generating the multiple quantized latent representations based respectively on separate input images, the separate input images being formed by repeatedly down-sampling the received image.

22. A non-transitory computer readable medium having encoded thereon program code for image compression, the program code being executed by a processor and comprising:

program code to receive an image; and program code to generate multiple quantized latent representations to represent features of the image, each of the quantized latent representations having a different resolution and being generated at staggered timings and in which later generated quantized latent representations are conditioned on prior generated quantized latent representations.

23. The non-transitory computer readable medium of clause 22, further comprising program code to reconstruct the image at multiple resolutions.

24. The non-transitory computer readable medium of clause 22 or 23, further comprising program code to supply as feedback a quantization error for a first quantized latent, the quantization error being applied for generating a next succeeding quantized latent.

25. The non-transitory computer readable medium of clause 22 or 23 or 24, further comprising program code to learn a hierarchical representation of latent representations across different resolutions.

26. The non-transitory computer readable medium of any of clauses 22-25, further comprising program code to perform processing for generating the multiple quantized latent representations in parallel.

27. The non-transitory computer readable medium of any of clauses 22-26, further comprising program code to distribute processing of computations for generating the multiple quantized latent representations evenly across the multiple quantized latent representations.

28. The non-transitory computer readable medium of any of clauses 22-27, further comprising program code to generate the multiple quantized latent representations based respectively on separate input images, the separate input images being formed by repeatedly down-sampling the received image.

29. A method comprising:

receiving quantized latent representations corresponding to an image, each of the quantized latent representations received at staggered timings and having different resolutions;

decoding the quantized latent representations to reconstruct data for each of the different resolutions; and fusing the reconstructed data for each of the different resolutions to generate a reconstructed image.

30. The method of clause 29, further comprising supplying as feedback a quantization error for a first quantized latent representation, the quantization error being applied for decoding a next succeeding quantized latent representation.

31. The method of clause 29 or 30, further comprising learning a hierarchical representation of latent representations across different resolutions.

32. An apparatus for image compression comprising:

a memory; and at least one processor coupled to the memory, the at least one processor being configured:

to receive quantized latent representations corresponding to an image, each of the quantized latent representations received at staggered timings and having different resolutions;

to decode the quantized latent representations to reconstruct data for each of the different resolutions; and to fuse the reconstructed data for each of the different resolutions to generate a reconstructed image.

33. The apparatus of clause 32, in which the at least one processor is further configured to supply as feedback a quantization error for a first quantized latent representation, the quantization error being applied for decoding a next succeeding quantized latent representation.

34. The apparatus of clause 32 or 33, in which the at least one processor is further configured to learn a hierarchical representation of latent representations across different resolutions.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of image compression comprising:
receiving an image; and
generating multiple quantized latent representations to represent features of the image, each of the quantized latent representations representing successively lower resolution features of the image with a first quantized latent representation being generated for a lowest scaled representation corresponding to lowest resolution features of the image and successive quantized latent representations being generated at staggered timings for increasingly greater scaled representations respectively corresponding to increasingly higher resolution features of the image, in which prior generated quantized latent representations are generated based on convolution outputs associated with higher resolution features and later generated quantized latent representations are conditioned on prior generated quantized latent representations.

2. The method of claim 1, further comprising decoding the multiple quantized latent representations to reconstruct the image.

3. The method of claim 1, further comprising supplying as feedback a quantization error for a first quantized latent representation, the quantization error being applied for generating a next succeeding quantized latent representation.

4. The method of claim 1, further comprising learning a hierarchical representation of latent representations across different resolutions.

5. The method of claim 1, in which processing for generating the multiple quantized latent representations is performed in parallel.

6. The method of claim 1, in which processing of computations for generating the multiple quantized latent representations is distributed evenly across the multiple quantized latent representations.

7. The method of claim 1, in which the multiple quantized latent representations are respectively generated based on separate input images, the separate input images being formed by repeatedly down-sampling the received image.

8. An apparatus for image compression comprising:
a memory; and
at least one processor coupled to the memory, the at least one processor being configured:
to receive an image; and
to generate multiple quantized latent representations to represent features of the image, each of the quantized latent representations representing successively lower resolution features of the image with a first quantized latent representation being generated for a lowest scaled representation corresponding to lowest resolution features of the image and successive quantized latent representations being generated at staggered timings for increasingly greater scaled representations respectively corresponding to increasingly higher resolution features of the image, in which prior generated quantized latent representations are generated based on convolution outputs associated with higher resolution features and later generated quantized latent representations are conditioned on prior generated quantized latent representations.

9. The apparatus of claim 8, in which the at least one processor is further configured to decode the multiple quantized latent representations to reconstruct the image.

10. The apparatus of claim 8, in which the at least one processor is further configured to supply as feedback a quantization error for a first quantized latent representation, the quantization error being applied for generating a next succeeding quantized latent representation.

11. The apparatus of claim 8, in which the at least one processor is further configured to learn a hierarchical representation of latent representations across different resolutions.

12. The apparatus of claim 8, in which the at least one processor is further configured to perform processing for generating the multiple quantized latent representations in parallel.

13. The apparatus of claim 8, in which the at least one processor is further configured to distribute processing of computations for generating the multiple quantized latent representations evenly across the multiple quantized latent representations.

14. The apparatus of claim 8, in which the at least one processor is further configured to generate the multiple quantized latent representations based respectively on separate input images, the separate input images being formed by repeatedly down-sampling the received image.

15. A method comprising:
receiving quantized latent representations corresponding to an image, each of the quantized latent representations received at staggered timings and having different resolutions with a first quantized latent representation being received for a lowest scaled representation corresponding to lowest resolution features of the image and successive quantized latent representations being received for increasingly greater scaled representations, respectively corresponding to increasingly higher resolution features of the image, and in which each of the quantized latent representations are generated based on convolution outputs associated with higher resolution features and later generated quantized latent representations are conditioned on prior generated quantized latent representations;
decoding the quantized latent representations to reconstruct data for each of the different resolutions; and
fusing the reconstructed data for each of the different resolutions to generate a reconstructed image.

16. The method of claim 15, further comprising supplying as feedback a quantization error for the first quantized latent representation, the quantization error being applied for decoding a next succeeding quantized latent representation.

17. The method of claim 15, further comprising learning a hierarchical representation of latent representations across the different resolutions.

18. An apparatus for image compression comprising:
a memory; and
at least one processor coupled to the memory, the at least one processor being configured:
to receive quantized latent representations corresponding to an image, each of the quantized latent representations received at staggered timings and having different resolutions with a first quantized latent representation being received for a lowest scaled representation corresponding to lowest resolution features of the image and successive quantized latent representations being received for increasingly greater scaled representations, respectively corresponding to increasingly higher resolution features of the image, and in which each of the quantized latent representations are generated based on convolution outputs associated with higher resolution features and later generated quantized latent representations are conditioned on prior generated quantized latent representations;
to decode the quantized latent representations to reconstruct data for each of the different resolutions; and
to fuse the reconstructed data for each of the different resolutions to generate a reconstructed image.

19. The apparatus of claim 18, in which the at least one processor is further configured to supply as feedback a quantization error for the first quantized latent representation, the quantization error being applied for decoding a next succeeding quantized latent representation.

20. The apparatus of claim 18, in which the at least one processor is further configured to learn a hierarchical representation of latent representations across the different resolutions.

* * * * *